US012703769B2

(12) United States Patent
Chajda et al.

(10) Patent No.: US 12,703,769 B2
(45) Date of Patent: Aug. 11, 2026

(54) RHEOLOGY CONTROL AGENT

(71) Applicant: BYK-Chemie GmbH, Wesel (DE)

(72) Inventors: Dominika Chajda, Wesel (DE); René Nagelsdiek, Hamminkeln (DE); Vera Leonhard, Mettman (DE); Heribert Holtkamp, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 584 days.

(21) Appl. No.: 18/039,297

(22) PCT Filed: Dec. 1, 2021

(86) PCT No.: PCT/EP2021/083717

§ 371 (c)(1),
(2) Date: May 30, 2023

(87) PCT Pub. No.: WO2022/117621

PCT Pub. Date: Jun. 9, 2022

(65) Prior Publication Data

US 2024/0002582 A1 Jan. 4, 2024

(30) Foreign Application Priority Data

Dec. 4, 2020 (EP) .................................... 20211772

(51) Int. Cl.

| | |
|---|---|
| ***C09D 7/44*** | (2018.01) |
| ***C08G 18/80*** | (2006.01) |
| ***C08K 5/205*** | (2006.01) |
| ***C08K 5/21*** | (2006.01) |
| ***C09D 5/02*** | (2006.01) |
| ***C09D 5/04*** | (2006.01) |
| ***C09D 175/04*** | (2006.01) |

(52) U.S. Cl.

CPC .......... *C08G 18/8064* (2013.01); *C08K 5/205* (2013.01); *C08K 5/21* (2013.01); *C09D 5/024* (2013.01); *C09D 5/04* (2013.01); *C09D 7/44* (2018.01); *C09D 175/04* (2013.01)

(58) Field of Classification Search

CPC ........ C09D 175/04; C09D 5/04; C09D 5/024; C09D 7/44

See application file for complete search history.

(56) References Cited

U.S. PATENT DOCUMENTS

| | | | |
|---|---|---|---|
| 3,766,070 | A | 10/1973 | Wulfers |
| 4,314,924 | A | 2/1982 | Haubennestel |
| 6,420,466 | B1 | 7/2002 | Haubennestel |
| 6,617,468 | B2 | 9/2003 | Haubennestel |
| 6,870,024 | B2 | 3/2005 | Haubennestel |
| 7,250,487 | B2 | 7/2007 | Tournilhac |
| 7,348,397 | B2 | 3/2008 | Tournilhac |
| 7,655,815 | B2 | 2/2010 | Haubennestel et al. |
| 8,956,452 | B2 | 2/2015 | Orth |
| 9,458,332 | B2 | 10/2016 | Leutfeld |
| 9,617,371 | B2 | 4/2017 | Leutfeld |
| 9,796,860 | B2 | 10/2017 | Leutfeld |
| 10,377,906 | B2 | 8/2019 | Leutfeld |
| 11,453,750 | B2 | 9/2022 | Nagelsdiek et al. |

(Continued)

FOREIGN PATENT DOCUMENTS

| | | |
|---|---|---|
| CN | 1338453 | 3/2002 |
| CN | 102597036 | 7/2012 |

(Continued)

OTHER PUBLICATIONS

International Search Report and Written Opinion for International Application No. PCT/EP2021/083717 dated Jan. 25, 2022.

*Primary Examiner* — Michael L Leonard

(57) ABSTRACT

The invention relates to a composition comprising a mixture of compounds according to formula (I) wherein IC1 and IC2 independently of one another and of each occurrence represent a hydrocarbyl group, AM independently of each occurrence represents a hydrocarbyl group, m is the average number of repeating units from 0 to 20, RP1 and RP2 independently of one another and of each occurrence represent an organic group selected from RP3, RP4, RP5, wherein RP3 represents a hydrocarbyl group, RP4 represents an organic group according to formula (II) RP41-$(AO)_n$- wherein RP41 represents a hydrocarbyl group having 1 to 24 carbon atoms, AO represents an alkylene oxide repeating unit and n is the average number of repeating units from 6 to 30, RP5 represents an organic group according to formula (III) RP51-$(AO)_p$- wherein RP51 represents a hydrocarbyl group having 1 to 24 carbon atoms, AO represents an alkylene oxide repeating unit and p is the average number of repeating units from 1 to 5, wherein the mixture comprises compounds of formula (I) wherein (A) RP1 is RP3 and RP2 is RP4, (B) RP1 is RP4 and RP2 is RP5, (C) RP1 is RP3 and RP2 is RP5.

(I)

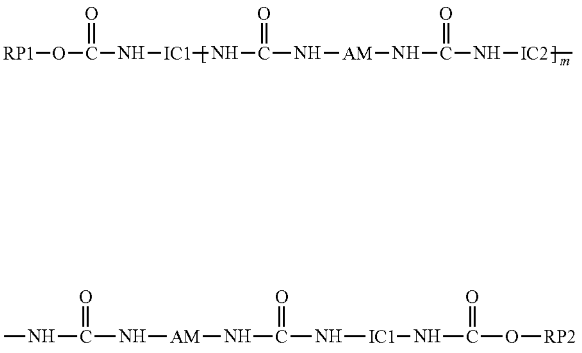

17 Claims, No Drawings

(56) References Cited

U.S. PATENT DOCUMENTS

| | | | |
|---|---|---|---|
| 2002/0115882 A1 | 8/2002 | Haubennestel | |
| 2004/0127674 A1 | 7/2004 | Haubennestel | |
| 2012/0226075 A1 | 9/2012 | Leutfeld | |
| 2017/0037262 A1* | 2/2017 | Leutfeld ............ | C08G 18/2825 |
| 2020/0308106 A1 | 10/2020 | Knappke-Bongartz et al. | |

FOREIGN PATENT DOCUMENTS

| | | |
|---|---|---|
| DE | 2822908 | 7/1979 |
| DE | 19919482 | 11/2000 |
| DE | 10126647 | 12/2002 |
| DE | 102008059702 | 6/2010 |
| DE | 102015004640 | 10/2015 |
| EP | 1188779 | 3/2002 |
| EP | 1396510 | 3/2004 |
| EP | 2292675 | 3/2011 |
| EP | 3131941 | 2/2017 |
| EP | 3728363 | 10/2020 |
| GB | 1454414 | 11/1976 |
| JP | H08176268 | 7/1996 |
| JP | H09302062 | 11/1997 |
| JP | 2002105042 | 4/2002 |
| JP | 2004099896 | 4/2004 |
| JP | 2013503953 | 2/2013 |
| KR | 20000075971 | 12/2000 |
| KR | 20020014680 | 2/2002 |
| KR | 20120083393 | 7/2012 |
| WO | 9839373 | 9/1998 |
| WO | 2007105258 | 9/2007 |
| WO | 2014111102 | 7/2014 |
| WO | 2015158407 | 10/2015 |
| WO | 2015158794 | 10/2015 |
| WO | 2019122222 | 6/2019 |
| WO | 2020182944 | 9/2020 |

* cited by examiner

RHEOLOGY CONTROL AGENT

The invention relates to a composition comprising a mixture of compounds according to formula (I) and its use for controlling the rheology of a liquid composition. The invention further relates to a liquid composition comprising the mixture of compounds according to formula (I) and an article which is coated with the liquid composition.

The rheology of liquid systems is often controlled using clays, e.g. bentonites and/or silicas, which may optionally be organically modified, hydrogenated castor oil, and polyamide waxes. A disadvantage of these rheology control auxiliaries is that they are mostly dry solids, which must be processed to a semi-finished form using solvents and shear forces, and/or introduced into the liquid system by means of targeted temperature control. Non-observance of these temperatures and/or appropriate incorporation conditions can lead not only to poor rheological performance, but also to detrimental properties of the products.

In case the liquid systems are coating compositions, these rheology control auxiliaries frequently lead to instances of clouding and haze in clear, transparent coatings. Moreover, operating with dry, powderous products, which cause dusts during processing, may be technologically unfavorable.

A liquid application alternative to these rheology control auxiliaries is provided by solutions of particular urea components as described for example in EP 1 188 779 A. Serving as solvent and/or carrier medium are typically polar/aprotic solvents. Alternatively, instead of classical organic diluents ionic liquids can be used as described in DE 102008059702 A.

Those liquid rheology control auxiliaries need to comply with a multiplicity of requirements. They have to show not only an improved rheological activity, but also a broad compatibility in application-relevant formulations as well.

A further aspect, which should be noted in connection with rheology control auxiliaries provided in liquid form is that certain unwanted effects may occur. Incorporation of, for example, urea urethane rheology control agents into the liquid phase of the application system may lead to the formation of pronounced elastic behaviour. This effect, also known as jelly effect, leads to an unwanted visual appearance as well as surface defects of the applied coating. A further drawback is related to a more complicated incorporation of the rheology additive. All these parameters mentioned above limit the choice of adequate preparations. The choice of suitable rheology control auxiliaries is therefore difficult, since these especially have to be compatible with the later application systems and meet further demands as well.

There is therefore a need for rheology control auxiliaries that are improved in terms of rheological efficacy a well as concerning other parameters mentioned above.

Thus, it is a particular object of the present invention to provide a high-quality rheology control agent of good effectiveness and easy incorporation which is employable in numerous application systems and does not show distinct elastic behaviour, while maintaining the favourable properties of the rheology control agents of the state of the art. Such favourable properties are for example the sag resistance as well as the amount of leveling and orange peel that the rheology control agent can provide in the application system.

Surprisingly it has been found that these objectives can be achieved by the provision of a composition comprising a mixture of compounds according to formula (I)

(I)

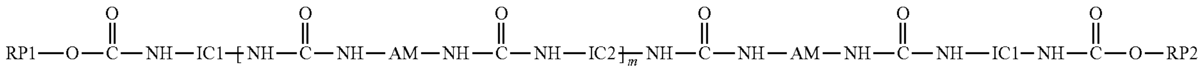

wherein IC1 and IC2 independently of one another and of each occurrence represent a hydrocarbyl group, AM independently of each occurrence represents a hydrocarbyl group, m is the average number of repeating units from 0 to 20, RP1 and RP2 independently of one another and of each occurrence represent an organic group selected from RP3, RP4, RP5, wherein RP3 represents a hydrocarbyl group, RP4 represents an organic group according to formula (II)

$$RP41\text{-}(AO)_n\text{-} \quad (II)$$

wherein RP41 represents a hydrocarbyl group having 1 to 24 carbon atoms,

AO represents an alkylene oxide repeating unit and n is the average number of repeating units from 6 to 30, RP5 represents an organic group according to formula (III)

$$RP51\text{-}(AO)_p\text{-} \quad (III)$$

wherein RP51 represents a hydrocarbyl group having 1 to 24 carbon atoms,

AO represents an alkylene oxide repeating unit and p is the average number of repeating units from 1 to 5, wherein the mixture comprises compounds of formula (I) wherein (A) RP1 is RP3 and RP2 is RP4, (B) RP1 is RP4 and RP2 is RP5, (C) RP1 is RP3 and RP2 is RP5.

Preferably, AM is selected from a linear or branched, saturated or unsaturated, aliphatic, cycloaliphatic, aromatic or aliphatic-aromatic hydrocarbyl group having 2 to 50 C atoms; in case of multiple occurrence of AM, AM is independently selected from a linear or branched, saturated or unsaturated, aliphatic, cycloaliphatic, aromatic or aliphatic-aromatic hydrocarbyl group having 2 to 50 C atoms.

It is preferred that IC1 and IC2 independently of one another represent a linear or branched or cyclic, saturated or unsaturated, aliphatic, aromatic or aliphatic-aromatic hydrocarbyl group having 2 to 40 C atoms; in case of multiple occurrence of IC1 and IC2, IC1 and IC2 represent independently the radical described above, m is the average number of repeating units from 0 to 20, preferably from 0 to 10, more preferably from 0 to 7, even more preferably from 0 to 5, such as from 0 to 3. It is most preferred that m is 0.

In another embodiment, m is the average number of repeating units from 1 to 20, preferably 1 to 10, more preferably from 1 to 7, such as from 1 to 5.

In a preferred embodiment IC1 and IC2 are preferably selected from one of the following bivalent groups (with "*" indicating the connection sites)

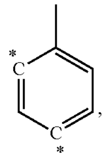,
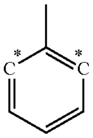,
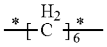,

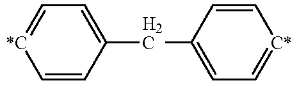

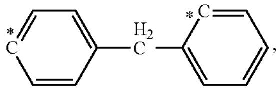,

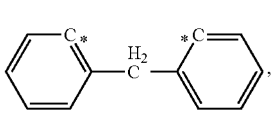,
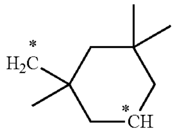,

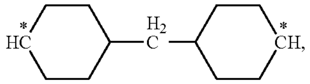

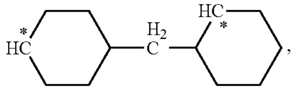,

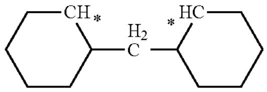

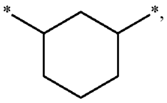,

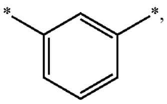,
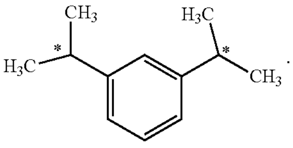.

and in which AM is selected from a group $C_2H_4$, $C_3H_6$, $C_4H_8$, $C_5H_{10}$, $C_6H_{12}$, $C_6H_{10}$, $CH_2—C_6H_4—CH_2$ or a group

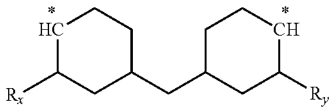

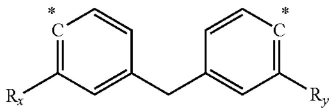

in which $R_x$ and $R_y$ represent H or $CH_3$.

In a very preferred embodiment IC1 is selected from

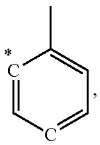,
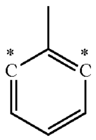,
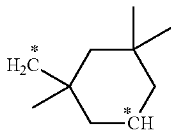

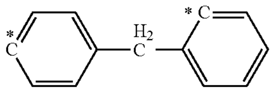,

-continued

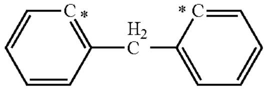

Even more preferably, IC1 and IC2 are selected from

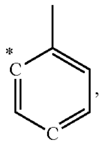,
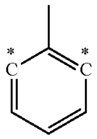

In a very preferred embodiment, AM is selected from $C_2H_4$, $C_3H_6$ and $CH_2—C_6H_4—CH_2$. It is even more preferred that AM is selected from $C_2H_4$ and $CH_2—C_6H_4—CH_2$.

The urea-based compounds may be prepared in a known way by reaction of corresponding isocyanates with amines, e.g. amines or isocyanates as described in claim 14 of WO 2015 158 407. Preparation processes for urea compounds of this kind are described in more detail for example in U.S. Pat. No. 7,250,487 B2, U.S. Pat. No. 7,348,397 B2, EP 13 96 510 A1, EP 2 292 675 A1.

The end groups RP1 and RP2 of the urea-based compounds independently of one another and of each occurrence represent an organic group selected from RP3, RP4, RP5.

RP3 represents a hydrocarbyl group. Suitably, RP3 represents a hydrocarbyl group having 6 to 24 carbon atoms. More suitably, RP3 represents a hydrocarbyl group having 8 to 20 carbon atoms and most suitably 9 to 18 carbon atoms. RP3 may represent a saturated or unsaturated, an aromatic or araliphatic hydrocarbyl group, preferably an alkyl or alkenyl group. Most preferably, RP3 represents an alkyl group. In a suitable embodiment, RP3 is a branched or linear hydrocarbyl group.

RP4 represents an organic group according to formula (II)

$$\text{RP41-(AO)}_n\text{-} \qquad \text{(II)}$$

wherein RP41 represents a hydrocarbyl group having 1 to 24 carbon atoms. In one embodiment, RP41 represents a hydrocarbyl group having 1 to 5 carbon atoms whereas in another embodiment, RP41 represents a hydrocarbyl group having 6 to 24 carbon atoms.

AO represents an alkylene oxide repeating unit. Alkylene oxide repeating units may be based on ethylene oxide, propylene oxide, butylene oxide, and mixtures thereof. It is preferred that the n AO repeating units in RP4 comprise 70 to 100 mol % ethylene oxide repeating units, calculated on the number of AO repeating units in RP4. It is more preferred that the n AO repeating units in RP4 comprise 90 to 100 mol % ethylene oxide repeating units, calculated on the number of AO repeating units in RP4 and even most preferred that the n AO repeating units in RP4 comprise 100 mol % ethylene oxide repeating units.

n is the average number of repeating units from 6 to 30. Preferably, n is the average number of repeating units from 6 to 25, more preferably the average number of repeating units from 6 to 20, even more preferably from 6 to 17, such as from 6 to 14.

RP5 represents an organic group according to formula (III)

$$\text{RP51-(AO)}_p\text{-} \qquad \text{(III)}$$

wherein RP51 represents a hydrocarbyl group having 1 to 24 carbon atoms. Preferably, RP51 represents a hydrocarbyl group having 1 to 8 carbon atoms and more preferably, RP51 represents a hydrocarbyl group having 1 to 4 carbon atoms. In a preferred embodiment, RP51 represents a linear hydrocarbyl group; it is very preferred that RP51 represents a linear alkyl group.

AO represents an alkylene oxide repeating unit. Alkylene oxide repeating units of RP5 may be based on ethylene oxide, propylene oxide, butylene oxide, and mixtures thereof. Suitably, the p AO repeating units in RP5 comprise 95 to 100 mol % of ethylene oxide repeating units, calculated on the number of AO repeating units in RP5. More suitably, RP5 comprises 100 mol % of ethylene oxide repeating units.

p is the average number of repeating units from 1 to 5. In another embodiment, p is the average number of repeating units from 1 to 4, more preferred from 2 to 4, such as 2.5 to 3.5.

The composition according to the present invention comprises a mixture of compounds according to formula (I) wherein (A) RP1 is RP3 and RP2 is RP4,
(B) RP1 is RP4 and RP2 is RP5,
(C) RP1 is RP3 and RP2 is RP5.

The mixture of compounds according to formula (I) may additionally comprise further compounds. For example, it may comprise compounds wherein (D) RP1 is RP3 and RP2 is RP3
(E) RP1 is RP4 and RP2 is RP4
(F) RP1 is RP5 and RP2 is RP5.

The invention further relates to a process for the preparation of the mixture of compounds according to formula (I). The process comprises the steps of 1.) reacting at least three monohydroxy compounds selected from RP3-OH, RP4-OH and RP5-OH with at least one diisocyanate of the formula OCN-IC1-NCO and optionally with at least one diisocyanate of the formula OCN-IC2-NCO to give monoisocyanate urethane adducts and
2.) reacting the monoisocyanate urethane adducts with at least one diamine of the formula $NH_2$-AM-$NH_2$.

A monoisocyanate urethane adduct is a molecule which contains one urethane group and one isocyanate group.

AM, IC1, IC2, RP3, RP4 and RP5 have the meaning as described above.

For the preparation of the mixture of compounds according to formula (I) in a first step, three different monohydroxy compounds are reacted with one or more than one diisocyanate to give monoisocyanate urethane adducts, which as a result differ in their alcohol components. Reacting these monoisocyanate urethane adducts with diamines in a second step leads to the formation of six different urea urethanes which differ in their two end groups (RP1 and RP2) and can be described as follows:

(A) RP1 is RP3 and RP2 is RP4,
(B) RP1 is RP4 and RP2 is RP5,
(C) RP1 is RP3 and RP2 is RP5,
(D) RP1 is RP3 and RP2 is RP3,
(E) RP1 is RP4 and RP2 is RP4,
(F) RP1 is RP5 and RP2 is RP5.

Combination (A) results from the reaction of a diisocyanate with two different monohydroxy compounds in the first step, namely those as described above for RP3 and RP4. Accordingly, combination (B) is the reaction product of a diisocyanate with two different monohydroxy compounds in the first step as described for RP4 and RP5 and compound (C) reacted with the two monohydroxy compounds as described for RP3 and RP5 in the first step. Therefore, the compounds according to combinations (A), (B) and (C) each have two different end groups RP1 and RP2 in the manner described above.

On the other hand, each of combinations (D), (E) and (F) are the reactions products of diisocyanates with one type of monohydroxy compound only. Therefore, combination (D) has two end groups as described for RP3, combination (E) has two end group as described for RP4 and combination (F) has two end groups as described for RP5.

The composition suitably comprises
at least 12% by weight of compound (A)
at least 9% by weight of compound (B)
at least 10% by weight of compound (C),
calculated on the total weight of compounds according to formula (I).

More suitably, the composition comprises
at least 13% by weight of compound (A)
at least 10% by weight of compound (B)
at least 13% by weight of compound (C)
calculated on the total weight of compounds according to formula (I).

Most suitably, the composition comprises
at least 14% by weight of compound (A)
at least 12% by weight of compound (B)
at least 17% by weight of compound (C)
calculated on the total weight of compounds according to formula (I).

The composition preferably comprises
12 to 33% by weight of compound (A)
9 to 35% by weight of compound (B)
10 to 30% by weight of compound (C),
calculated on the total weight of compounds according to formula (I).

More preferably, the composition comprises
12 to 31% by weight of compound (A)
9 to 34% by weight of compound (B)
10 to 28% by weight of compound (C),
calculated on the total weight of compounds according to formula (I).

Even more preferably, the composition comprises
12 to 29% by weight of compound (A)
9 to 33% by weight of compound (B)
10 to 27% by weight of compound (C),
calculated on the total weight of compounds according to formula (I).

Most preferably, the composition comprises
12 to 27% by weight of compound (A)
9 to 32% by weight of compound (B)
10 to 25% by weight of compound (C),
calculated on the total weight of compounds according to formula (I).

Preferably, the composition comprises
at least 4% by weight of compound (D)
at least 6% by weight of compound (E)
at least 4% by weight of compound (F),
calculated on the total weight of compounds according to formula (I).

More preferably, the composition comprises
at least 5% by weight of compound (D)
at least 7% by weight of compound (E)
at least 5% by weight of compound (F)
calculated on the total weight of compounds according to formula (I).

Most preferably, the composition comprises at least 6% by weight of compound (D)

at least 8% by weight of compound (E)

at least 6% by weight of compound (F), calculated on the total weight of compounds according to formula (I).

In a different embodiment, the composition comprises 4 to 30% by weight of compound (D)

6 to 22% by weight of compound (E)

4 to 30% by weight of compound (F), calculated on the total weight of compounds according to formula (I).

4 to 28% by weight of compound (D)

6 to 20% by weight of compound (E)

4 to 28% by weight of compound (F), calculated on the total weight of compounds according to formula (I).

4 to 27% by weight of compound (D)

6 to 18% by weight of compound (E)

4 to 26% by weight of compound (F), calculated on the total weight of compounds according to formula (I).

4 to 25% by weight of compound (D)

6 to 16% by weight of compound (E)

4 to 24% by weight of compound (F), calculated on the total weight of compounds according to formula (I).

In a further embodiment, the composition comprises less than 40% by weight of each of (A), (B), (C), (D), (E) and (F) calculated on the total weight of compounds according to formula (I). In another embodiment, the composition comprises not more than 35% by weight of each of (A), (B), (C), (D), (E) and (F).

Preferably, the composition comprises 26 to 55 mol % of RP3

22 to 35 mol % of RP4

22 to 45 mol % of RP5 calculated on the sum of RP3, RP4 and RP5.

Additionally, the composition may comprise one or more salts. Generally, all salts are suitable which have a melting point higher than 80° C. and are different from ionic liquids.

The salts according to the present invention are containing cations of elements of the main groups I and II of the Periodic Table of the Elements (alkali and alkaline earth metals) or ammonium ions (incl. substituted ammonium ions, e.g., alkylammonium ions) and mixtures thereof. Preferred salts are such containing lithium, calcium or magnesium, particularly preferably lithium and calcium cations. In some embodiments, the salts contain as anions preferably monovalent anions, particularly preferably halides, pseudohalides, formates, acetates and/or nitrates, most particularly preferably chlorides, acetates and/or nitrates.

Particularly preferred as salts are inorganic lithium salts, such as lithium chloride or lithium nitrate, as well as ammonium salts, for example alkyl ammonium salts, in particular quaternary ammonium salts, such as tetra-alkyl ammonium halides.

In the composition, the one or more salts are preferably present in an amount of 0.0 to 10.0% by weight, more preferably 0.0 to 6.0% by weight, even more preferably 0.0 to 4.0% by weight and most preferably 0.0 to 2.0% by weight, calculated on the weight of the mixture of compounds according to formula (I) and salt.

Moreover, the composition suitably comprises one or more diluents. The one or more diluents may be organic or inorganic. They are preferably organic diluents. The one or more diluents do not contain urea groups, and typically comprise an aprotic polar diluent. The organic diluent includes volatile organic solvents as well as non-volatile organic solvents.

Examples of suitable diluents include amides, preferably cyclic amides (i. e. lactams), non-cyclic dialkyl amides of mono- and difunctional carboxylic acids, sulfoxides, preferably dimethyl sulfoxide and/or ionic liquids. Particularly suitable are diluents selected from the group of N-alkyl-lactams, preferably N-alkyl butyrolactams, wherein the alkyl groups are selected from $C_1$ to $C_{12}$ alkyl groups.

Examples of N-alkylbutyrolactams are N-methylbutyrolactam, N-ethylbutyrolactam, N-butylbutyrolactam, N-octylbutyrolactam and N-hydroxyethyl butyrolactam. Suitable examples of N-substituted caprolactams are N-vinyl caprolactam, N-ethyl caprolactam, N-methyl caprolactam, N-acetyl caprolactam, N-butyl caprolactam, N-propyl caprolactam. Examples of linear amides are N,N-dimethylformamide, N,N-dimethylacetamide, N,N-dialkylamidoalkyl esters, N,N-dialkylamidoalkyl ethers, hexamethylphosphoric triamide and acylmorpholines. Preferred examples of these are also N,N-dimethylamidoalkyl ester, N,N-dimethylamidoalkyl ether, N-formylmorpholine and N-acetylmorpholine.

In another preferred embodiment, the one or more organic diluents of the composition are ionic liquids. In the context of the present invention, so-called ionic liquids are organic salts with a melting point below or equal to 80° C.

Examples of ionic liquids are substituted imidazolium salts, e.g. 1-ethyl-3-methylimidazolium acetate, 1-ethyl-3-methylimidazolium acetate, 1-ethyl-3-methylimidazolium-ethylsulfate, 1-butyl-3-methylimidazolium ethylsulfate, 1-ethyl-3-methylimidazoliumthiocyanate and 1-butyl-3-methylimidazolium thiocyanate. Ionic liquids may be combined with the non-ionic organic diluents mentioned above.

In the composition, the one or more diluents are preferably present in an amount of 35.0 to 95.0% by weight, more preferably 40.0 to 94.0% by weight, even more preferably 45.0 to 90.0% by weight, calculated on the weight of the mixture of compounds according to formula (I) and diluent.

In a preferred embodiment the composition comprises 5 to 65% by weight of the mixture of compounds according to formula (I)

35 to 95% by weight of the one or more diluents and 0 to 10% by weight of the one or more salts calculated on the total weight of the composition.

In a more preferred embodiment, the composition comprises 6 to 60% by weight of the mixture of compounds according to formula (I)

40 to 94% by weight of the one or more diluents and 0 to 8% by weight of the one or more salts calculated on the total weight of the composition.

In an even more preferred embodiment, the composition comprises 7 to 58% by weight of the mixture of compounds according to formula (I)

42 to 93% by weight of the one or more diluents and 0 to 6% by weight of the one or more salts calculated on the total weight of the composition.

In a further preferred embodiment, the composition comprises 10 to 55% by weight of the mixture of compounds according to formula (I)

45 to 90% by weight of the one or more diluents and 0 to 4% by weight of the one or more salts calculated on the total weight of the composition.

The composition of the present invention may be employed to control the rheology of various kinds of liquid compositions. In a preferred embodiment, the liquid composition may be an aqueous composition. The primary or even the only liquid diluting agent of a liquid aqueous composition is water. Additionally, the liquid aqueous composition may comprise certain amounts of organic diluents. The organic diluents are the same or different from the one or more diluents described above. It is preferred that the liquid aqueous composition comprises less than 50% by weight, preferably less than 40% by weight, more preferably less than 30% by weight, even more preferably less than 20% by weight and most preferably less than 10% or even less than 5% by weight of organic diluents, calculated on the total weight of the aqueous liquid composition. In a special embodiment, the liquid aqueous composition does not contain organic diluents at all.

In general, a liquid aqueous composition comprises at least 10%, preferably at least 15%, more preferably at least 20% by weight of water, calculated on the total weight of the liquid aqueous composition. In certain cases, a liquid aqueous composition can comprise at least 25%, more preferably at least 30% by weight of water. In general, a liquid aqueous composition comprises at most 90% by weight of water, such as up to 80% or up to 70% by weight. In special embodiments, the liquid aqueous composition comprises up to 95%, or even up to 97, 98, or 99% by weight of water.

In another embodiment, the liquid composition may be a non-aqueous composition. A non-aqueous liquid composition is essentially free from water. That denotes a non-aqueous liquid composition suitably comprising between 0.0 and less than 10.0% by weight of water, preferably between 0.0 and 7.0% by weight of water, calculated on the total weight of the non-aqueous liquid composition. More preferably, the non-aqueous liquid composition comprises less than 5.0% by weight of water. For example, the liquid composition comprises less than 3.0% by weight or less than 1.0% by weight of water, calculated on the total weight of the liquid composition.

Suitably, the liquid composition is selected from a coating composition, a clear coat composition, a lacquer, a varnish, a plastic formulation, a pigment paste, an effect pigment paste, a polymer formulation, a sealant formulation, a cosmetic formulation, a homecare or industrial care formulation (including perfume and fragrance formulations), a ceramic formulation, an adhesive formulation, a liquid formulation for use in gas and oil production (including drilling, exploration), a composition for the manufacture of electrical components and circuits, a liquid formulation for use in energy storage media, a cleaning agent, a potting compound, a building material formulation, a lubricant, a filling compound, a wax emulsion, a metalworking fluid, a metal-processing product, a liquid composition in the form of a spraying agent, a so-called deposition aid (e.g., for use in plant protection agents or for the general purpose of drift reduction), an ink, a printing ink and an ink jet ink or a composition that may be used for corrosion protection in the field of marine and protective coatings and mixtures thereof.

The liquid compositions of the invention may further comprise customary additives. Examples of additives are antiblocking agents, stabilizers, antioxidants, pigments, wetting agents, dispersants, emulsifiers, additional rheology additives, UV absorbers, free-radical scavengers, slip additives, defoamers, adhesion promoters, leveling agents, waxes, nanoparticles, film-forming auxiliaries, and flame retardants.

The invention also relates to a liquid composition which comprises the composition according to the present invention. The term liquid composition denotes a composition being liquid at 23° C. and 100 kPa. Preferably, the liquid composition comprises a binder. It is very preferred that the liquid composition which comprises the composition is an aqueous composition.

All customary binders known to the skilled person are suitable as binder components. In one embodiment, the binder used in accordance with the invention has crosslinkable functional groups. Any customary crosslinkable functional group known to the skilled person is contemplated here.

Moreover, suitable examples for film-forming binders may comprise synthetic or natural resins such as alkyds; acrylics, such as self-crosslinking multiphase acrylic dispersions, thermosetting acrylics, styrene-acrylate dispersions, water-reducible hydroxyfunctional polyacrylic dispersions in combination with aliphatic polyisocyanates; vinyl acrylics; vinyl acetate/ethylene copolymers; polyurethanes, polyesters; melamine resin; epoxy resins, optionally in combination with amine curing agents; silanes; siloxanes; silicate binders, natural oils; polyurethanes (1-component and 2-component systems); polyvinyl acetates; polyaspartics; PVC plastisols, PVC organosols; thermoplastics; unsaturated polyester resins; as well as hybrids and combinations thereof.

The liquid composition comprising the binder can be provided as a one-component system or as a two-component system.

The liquid composition preferably comprises the binder in an amount of 3 to 90 wt.-%, preferably in an amount of 5 to 80 wt.-%, more preferably in an amount of 10 to 75 wt.-%, based on the total weight of the composition.

The liquid composition suitably comprises 0.01 to 15.00% by weight of the mixture of compounds according to the present invention, wherein the % by weight is calculated on the weight of the liquid composition. Preferably, the liquid composition comprises 0.10 to 10.00% by weight of the mixture of compounds according to formula (I), and more preferably 0.12 to 7.50% by weight, such as 0.15 to 5.00% by weight or 0.15 to 3.00% by weight.

In a further embodiment, the invention also relates to a process for controlling the rheology of a liquid composition comprising the steps of providing the composition according to the present invention, providing a liquid composition and mixing the composition according to the present invention and the liquid composition. Suitable liquid compositions are the liquid compositions as aforementioned amongst others. The step of mixing the components may be executed according to current processes known by the person skilled in the art. This may involve mixing by manual or electrical means inter alia.

In another embodiment, the invention relates to a coated article, wherein at least a part of the surface is coated with the liquid composition according to the present invention. Furthermore, in a different embodiment the invention relates to a coated article, wherein at least a part of the surface of the article is coated with the liquid composition according to the present invention and wherein the liquid composition is hardened.

Suitable articles are all three-dimensional objects, irrespective of their size and volume and whether they are mobile or immobile. Illustrative, but not limiting examples are building interiors and exteriors, flooring, furniture, vehicles used for transportation (like automobiles, bikes, boats, aircrafts, agricultural machines, and all kinds of freight vehicles), bridges and tunnels, machinery and production equipment, electrical devices, cans, metal coils, wires, containers, household articles and hardware, pulp and paper, as well as all kind of articles made of wood, metal, plastics or glass (e.g., for functional or ornamental use). The meaning of the wording "coating" is well-known to the person skilled in the art. In this context, it relates to the application of the liquid composition on the surface or other areas of said article to cover it at least partly or even encasing the article in its entirety. In this case, the liquid composition toughens or hardens after it has been applied to said article. Hardening means converting the liquid composition into a solid state. This can be achieved by evaporation of liquid diluents (physical drying) or by chemical cross-linking reaction (curing), and by combinations thereof.

Preparation of the Examples

Preparation of the Monoisocyanate Urethane Adducts

All monoadducts according to table 1 were prepared in two steps comprising the synthesis and removal of excess diisocyanate by thin film evaporation as follows:

A 4-fold molar excess of isocyanate groups with respect to alcohol groups were used. TDI was heated to 50-60° C. and the alcohol was added dropwise. As an example, for the synthesis of MA1, 139.3 g (0.8 mol) of TDI was heated to 50-60° C. and 179.52 g (0.4 mol) of a polyethylene glycol monomethyl ether with a hydroxyl number of 125 mg KOH/g as the alcohol component was added. The reaction mixture was stirred for 2-6 hours and the reaction conversion was controlled by the measurement of the isocyanate value.

Afterwards, the distillation of excess TDI was done via a thin-film evaporator at a temperature between 100° C. and 150° C. (at vacuum <1 mbar). After this step, the monoisocyanate urethane adducts contained less than 0.5% by weight of residual diisocyanate.

TABLE 1

| Monoisocyanate urethane adducts | Isocyanate | Alcohol |
|---|---|---|
| MA1 | TDI T80, a 80/20 mixture of 2,4-toluylene diisocyanate and 2,6-toluylene diisocyanate | polyethylene glycol monomethyl ether with a hydroxyl number of 125 mg KOH/g |
| MA2 | TDI T65, a 65/35 mixture of 2,4-toluylene diisocyanate and 2,6-toluylene diisocyanate | triethylene glycol monobutyl ether |
| MA3 | TDI T100, 2,4-toluylene diisocyanate | 1-dodecanol |
| MA4 | TDI T65, a 65/35 mixture of 2,4-toluylene diisocyanate and 2,6-toluylene diisocyanate | 3,5,5-trimethylhexanol |
| MA5 | TDI T65, a 65/35 mixture of 2,4-toluylene diisocyanate and 2,6-toluylene diisocyanate | oleyl alcohol |
| MA6 | TDI T80, a 80/20 mixture of 2,4-toluylene diisocyanate and 2,6-toluylene diisocyanate | polyethylene glycol monomethyl ether with a hydroxylnumber of 75 mg KOH/g |

Preparation of the Urea Urethanes

A four-necked round-bottom flask equipped with stirrer, thermometer and reflux condenser was charged with the solvent according to table 2 and the respective amount of lithium chloride and heated up to 80° C. under nitrogen atmosphere.

After 30 minutes m-xylylenediamine (m-XDA) was added to the mixture. Within 30 minutes after the addition of m-xylylenediamine, the monoisocyanate urethane adducts or the mixture of monoisocyanate urethane adducts according to table 1 were added and the mixture was stirred for two hours at 80° C.

TABLE 2

Preparation of examples 1-16

| Example | Monoisocyanate urethane adducts 1 | 2 | 3 | DMSO g | N-butylpyrrolidone g | LiCl g | m-XDA g | m-XDA mol |
|---|---|---|---|---|---|---|---|---|
| U1 | MA1<br>16.785 g<br>0.028 mol | MA2<br>16.703 g<br>0.041 mol | MA3<br>10.336 g<br>0.028 mol | — | 48.000 | 1.534 | 6.642 | 0.048 |
| U2 | MA1<br>21.440 g<br>0.035 mol | MA2<br>7.111 g<br>0.018 mol | MA3<br>6.601 g<br>0.018 mol | — | 60.000 | — | 4.848 | 0.035 |
| U3 | MA1<br>11.951 g<br>0.019 mol | MA2<br>7.928 g<br>0.020 mol | MA3<br>14.717 g<br>0.039 mol | — | 60.000 | — | 5.404 | 0.039 |
| U4 | MA1<br>13.729 g<br>0.022 mol | MA2<br>13.661 g<br>0.034 mol | MA4<br>7.178 g<br>0.023 mol | — | 60.000 | — | 5.433 | 0.039 |
| U5 | MA1<br>12.653 g<br>0.021 mol | MA2<br>8.394 g<br>0.021 mol | MA4<br>13.231 g<br>0.042 mol | — | 60.000 | — | 5.722 | 0.042 |
| U6 | MA6<br>17.476 g<br>0.018 mol | MA2<br>11.170 g<br>0.028 mol | MA3<br>6.912 g<br>0.018 mol | — | 60.000 | — | 4.442 | 0.032 |
| U7 | MA1<br>12.799 g<br>0.021 mol | MA2<br>12.736 g<br>0.032 mol | MA5<br>9.401 g<br>0.021 mol | — | 60.000 | — | 5.064 | 0.037 |
| U8* | MA1<br>35.937 g<br>0.059 mol | —<br>—<br>— | —<br>—<br>— | — | 60.000 | — | 4.063 | 0.030 |
| U9 | MA2<br>34.176 g<br>0.085 mol | —<br>—<br>— | —<br>—<br>— | — | 60.000 | — | 5.824 | 0.042 |
| U10* | MA3<br>33.795 g<br>0.090 mol | —<br>—<br>— | —<br>—<br>— | — | 60.000 | — | 6.205 | 0.045 |
| U11* | MA1<br>10.859 g<br>0.018 mol | MA3<br>6.686 g<br>0.018 mol | —<br>—<br>— | 80.000 | — | — | 2.455 | 0.018 |
| U12* | MA1<br>26.644 g<br>0.044 mol | MA2<br>8.838 g<br>0.022 mol | —<br>—<br>— | — | 60.000 | — | 4.518 | 0.033 |
| U13* | MA1<br>21.170 g<br>0.035 mol | MA2<br>14.044 g<br>0.035 mol | —<br>—<br>— | — | 60.000 | — | 4.786 | 0.035 |
| U14* | MA3<br>16.363 g<br>0.044 mol | MA2<br>17.628 g<br>0.044 mol | —<br>—<br>— | — | 60.000 | — | 6.009 | 0.044 |
| U15* | Mixture of examples U13* and U10* 2:1 | | | | | | | |
| U16* | Mixture of example U14* and U8* 2:1 | | | | | | | |

TABLE 3

| Non-volatile content of examples 1-16 | | |
|---|---|---|
| Sample | Non-volatile content in DMSO (%) | Non-volatile content in N-butylpyrrolidone (%) |
| U1 | — | 52 |
| U2 | — | 40 |
| U3 | — | 40 |
| U4 | — | 40 |
| U5 | — | 40 |
| U6 | — | 40 |
| U7 | — | 40 |
| U8* | — | 40 |
| U9* | — | 40 |
| U10* | — | 40 |
| U11* | 20 | — |
| U12* | — | 40 |
| U13* | — | 40 |
| U14* | — | 40 |
| U15* | — | 40 |
| U16* | — | 40 |

Comparative examples are marked with *.

The non-volatile content is indicated in percent by weight of the samples. The indicated values are theoretical values, calculated on the amount of urea-urethane and LiCl present in the samples.

TABLE 4

| Determination of contents of components A, B, C, D, E and F by high performance liquid chromatography coupled with mass spectrometry | | | | | | |
|---|---|---|---|---|---|---|
| Example | A weight-% | B weight-% | C weight-% | D weight-% | E weight-% | F weight-% |
| U1 | 16.1 | 27.2 | 20.1 | 7.4 | 10.1 | 19.1 |
| U2 | 20.4 | 24.7 | 9.6 | 5.4 | 33.3 | 6.6 |
| U3 | 23.0 | 14.2 | 23.0 | 21.9 | 10.0 | 7.9 |
| U4 | 15.0 | 26.8 | 19.3 | 6.8 | 10.7 | 21.4 |
| U5 | 25.1 | 14.2 | 20.7 | 22.9 | 9.0 | 8.1 |
| U6 | 15.0 | 31.0 | 19.3 | 4.8 | 13.9 | 16.0 |
| U7 | 17.2 | 25.4 | 21.3 | 8.8 | 9.0 | 18.3 |
| U8* | 0 | 0 | 0 | 0 | 100 | 0 |
| U9* | 0 | 0 | 0 | 0 | 0 | 100 |
| U10* | 0 | 0 | 0 | 100 | 0 | 0 |
| U11* | 45.0 | 0 | 0 | 21.0 | 34.0 | 0 |
| U12* | 0 | 43.3 | 0 | 0 | 46.4 | 10.3 |
| U13* | 0 | 47.5 | 0 | 0 | 27.3 | 25.2 |
| U14* | 0 | 0 | 47.3 | 19.4 | 0 | 33.3 |
| U15* | 0 | 32.6 | 0 | 29.2 | 20.2 | 18.0 |
| U16* | 0 | 0 | 29.5 | 13.7 | 35.8 | 21.0 |

The content of each component was determined by high performance liquid chromatography coupled with mass spectrometry. Eluent was a mixture of water with 0.9 mM/L sodium chloride and methanol with the following gradient: Starting at 30% methanol, going to 90% methanol in 20 minutes, to 100% methanol in 5 minutes, holding for 9 minutes, going back to initial mixture in 1 minute and holding until measurement was completed after 40 minutes. Flow is 0.5 mL/min. Employed column was Kinetex 2.6u XBridge—C18 100A 50 mm from Phenomenex. Temperature was 50° C. Detection and quantification via UV detector at 213 nm.

Application Tests

TABLE 5

| Raw materials | | |
|---|---|---|
| Component | Technical Description | Supplier |
| BYK-1615 | Mixture of foam-destroying polysiloxanes and hydrophobic solids | BYK-Chemie GmbH, Wesel, Germany |
| DISPERBYK-199 | Solution of a copolymer with pigment affinic groups | BYK-Chemie GmbH, Wesel, Germany |
| Acticide MBS | 1,2-benzisothiazolin-3-one & 2-methyl-4-isothiazolin-3-one, aqueous solution containing 2.5 weight-% of each of the two | THOR GmbH, Speyer, Germany |
| Kronos 2190 | Titanium dioxide | KRONOS Titan GmbH Leverkusen, Germany |
| Alberdingk AC 2025 | Water-based acrylate dispersion | Alberdingk Boley GmbH, Krefeld, Germany |
| Propylene Glycol | 1,2-propanediol | OQEMA Group Germany, Mönchengladbach |

TABLE 5-continued

| Raw materials | | |
|---|---|---|
| Component | Technical Description | Supplier |
| AQUACER 539 | Non-ionic emulsion of modified paraffin wax | BYK-Chemie GmbH, Wesel, Germany |
| RHEOBYK-T 1000 VF | Solution of a polyurethane | BYK-Chemie GmbH, Wesel, Germany |
| BYK-093 | Mixture of foam-destroying polysiloxanes and hydrophobic solids | BYK-Chemie GmbH, Wesel, Germany |

TABLE 5-continued

| Raw materials | | |
|---|---|---|
| Component | Technical Description | Supplier |
| BYK-349 | Polyether-modified siloxane | BYK-Chemie GmbH, Wesel, Germany |

Formulation of the Test System: White Paint based on Alberdingk AC 2025

TABLE 6

| Preparation of the paint formulation | | |
|---|---|---|
| Pos. | Component | Weight (%) |
| | Grind formulation: 20 min at 12 m/s | |
| 1 | Tap Water | 4.50 |
| 2 | BYK-1615 | 0.20 |
| 3 | DISPERBYK-199 | 0.70 |
| 4 | Acticide MBS | 0.20 |
| 5 | Kronos 2190 | 18.75 |
| | Let Down formulation: 10 min at 2 m/s | |
| 6 | Alberdingk AC 2025 | 59.00 |
| 7 | Propylene Glycol | 3.00 |
| 8 | Water | 7.41 |
| 9 | AQUACER 539 | 4.00 |
| 10 | RHEOBYK-T 1000 VF | 0.89 |
| 11 | BYK-093 | 0.30 |
| 12 | BYK-349 | 0.30 |
| | Total | 99.59 |
| | | pH-Value: >8.5 |

Production Process Mill Base:

Production of the test system white paint based on Alberdingk AC 2025 composition was carried out using the formulation in table 6. Ingredients 1 to 4 were mixed with a Dispermat: LC-220-6 VMA Getzmann for 5 min at 1 m/s. The ingredient at position 5 was grinded with a toothed disc VMA Getzmann for 20 min at 12 m/s at room temperature (23° C.) and added to the mixture of ingredients 1 to 4. The mixture containing ingredients 1 to 5 was grinded for 20 min at 12 m/s.

Production Process Let Down:

The ingredients in table 6 in the position from 6 to 12 were homogenized under stirring for 10 min at 2 m/s at room temperature. Afterwards, the produced mill base was added to the mixture of ingredients 6 to 12. The finished system (white paint based on Alberdingk AC 2025) was homogenized for 10 minutes at 2 m/s with a toothed disc VMA Getzmann.

Additive Incorporation:

50 g of the white paint based on Alberdingk AC 2025 was filled in a 175 mL plastic cup. 0.30 weight-%, calculated on the non-volatile content of the urea urethane as synthesized (U1-U16*) was added and incorporated into the white paint based on Alberdingk AC 2025 under stirring with a Dispermat CV (VMA Getzmann) for 5 minutes at 4 m/s by using a 4 cm diameter toothed disc. Afterwards, the samples were stored at 23° C. for 24 hours.

Evaluation of Test Application

Sag Resistance:

For the application, the samples were stirred with a spatula for homogenization and then applied with a stepped doctor blade by BYK-Chemie GmbH with 75-300 μm wet film thickness. The application was done on contrast cards 2851 (BYK-Gardner GmbH) using the automatic applicator byko drive XL (BYK-Gardner GmbH) with an application speed of 50 mm/s. Directly after application, the draw down was hanged up vertically with the thinnest film streak at the top at room temperature until it was dried. After drying, the visual evaluation of sag resistance was done. The wet film thickness was taken that showed after drying a clear separation of the draw down, without sagging and also without bulge/edge building between the applied film thickness.

Leveling:

For the application, the samples were stirred with a spatula for homogenization and then applied with a stripes blade by Leveling bar Leneta LTB-2. The application was done on contrast cards 2811 (BYK-Gardner GmbH) using the automatic applicator byko drive XL (BYK-Gardner GmbH) with an application speed of 50 mm/s. Directly after application, the draw down was dried at room temperature. After drying, the visual evaluation of leveling was done. A smooth surface without stripes was a 1 and showed a very good leveling surface. Very pronounced stripes showed not sufficient leveling and were countersigned with a 5.

Evaluation: 1=very good leveling, 2=good leveling, 3=medium leveling,

4=bad leveling, 5=not sufficient leveling

Elastic Behaviour (Viscosity):

The elastic behaviour of the white paint based on Alberdingk AC 2025 was evaluated after 24 hours. The samples were slowly stirred with a spatula for the visual evaluation of elastic behaviour. Special attention was paid to whether the samples showed a creamy viscosity or a not acceptable jelly effect. A very thin viscosity was also not acceptable.

Evaluation: 0=very thin viscosity (no rheological effect at all), 1=creamy viscosity, 5=jelly effect (formation of pronounced elastic behaviour)

Orange Peel:

24 hours after production the samples were stirred with a spatula for homogenization and then applied by a doctor blade from ERICHSEN GmbH and Co KG Model 360 96314 on 10 cm×20 cm glass panels. The wet film thickness was 150 μm. After drying, the visual evaluation of orange peel was done. The surface should not be uneven or bumpy or have any dents.

Evaluation: 1=no orange peel, 2=minimally orange peel, 3=medium orange peel, 4=bad orange peel, 5=not acceptable surface (lot of orange peel)

Specks:

24 hours after production the samples were stirred with a spatula for homogenization and then applied by doctor blade from ERICHSEN GmbH and Co KG Model 360 96314 with 150 μm wet film thickness on glass panels 10 cm×20 cm. After drying, the visual evaluation of specks was done. Values higher than 3 are not acceptable.

Evaluation: 1=no specks, 2=minimal specks, 3=medium specks, 4=lot of specks 5=not acceptable surface (the complete surface consists of specks)

TABLE 7

| Results of application tests | | | | | |
|---|---|---|---|---|---|
| Example | Elastic behaviour (Viscosity) | Orange Peel After Drying | Specks After Drying | Sag resistance | Leveling |
| Without Additive | 0 | 1 | 1 | 200 μm | 1 |
| U1 | 1 | 1 | 1 | >300 μm | 2 |
| U2 | 1 | 1 | 3 | >300 μm | 2 |
| U3 | 1 | 1 | 2 | >300 μm | 1 |

TABLE 7-continued

| Results of application tests | | | | | |
|---|---|---|---|---|---|
| Example | Elastic behaviour (Viscosity) | Orange Peel After | Specks Drying | Sag resistance | Leveling |
| U4 | 1 | 1 | 2 | >300 μm | 3 |
| U5 | 1 | 1 | 1 | >300 μm | 2 |
| U6 | 1 | 1 | 1 | >300 μm | 2 |
| U7 | 1 | 1 | 1 | >300 μm | 2 |
| U9* | 0 | 1 | 5 | 150 μm | 1 |
| U10* | 0 | 1 | 5 | >300 μm | 1 |
| U11* | 5 | 5 | 1 | >300 μm | 2 |
| U12* | 5 | 5 | 3 | >300 μm | 3 |
| U13* | 5 | 5 | 3 | >300 μm | 4 |
| U14* | 0 | 1 | 5 | 300 μm | 1 |
| U15* | 0 | 1 | 5 | >300 μm | 3 |
| U16* | 5 | 1 | 5 | 300 μm | 2 |

From table 7 it is visible, that the inventive examples showed a reduced elastic behaviour and less specs than the non-inventive examples (example without additive as well as examples marked with *). Moreover, the inventive examples maintained other favourable properties, such as a high sag resistance, less orange peel and better leveling.

The invention claimed is:

1. A composition comprising a mixture of compounds according to formula (I)

(I)

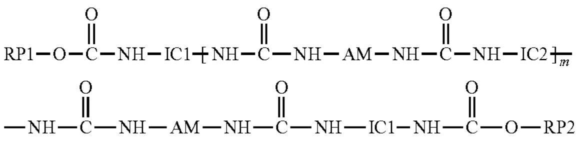

wherein IC1 and IC2 independently of one another and of each occurrence represent a hydrocarbyl group, AM independently of each occurrence represents a hydrocarbyl group, m is the average number of repeating units from 0 to 20, RP1 and RP2 independently of one another and of each occurrence represent an organic group selected from RP3, RP4, RP5, wherein RP3 represents a hydrocarbyl group, RP4 represents an organic group according to formula (II)

$$RP41\text{-}(AO)_n\text{-} \quad \text{(II)}$$

wherein RP41 represents a hydrocarbyl group having 1 to 24 carbon atoms,

AO represents an alkylene oxide repeating unit and n is the average number of repeating units from 6 to 30, RP5 represents an organic group according to formula (III)

$$RP51\text{-}(AO)_p\text{-} \quad \text{(III)}$$

wherein RP51 represents a hydrocarbyl group having 1 to 24 carbon atoms,

AO represents an alkylene oxide repeating unit and p is the average number of repeating units from 1 to 5, wherein the mixture comprises compounds of formula (I) wherein (A) RP1 is RP3 and RP2 is RP4, (B) RP1 is RP4 and RP2 is RP5, (C) RP1 is RP3 and RP2 is RP5.

2. The composition according to claim 1 wherein m is the average number of repeating units from 0 to 5.

3. The composition according to claim 1 wherein RP3 represents a hydrocarbyl group having 6 to 24 carbon atoms.

4. The composition according to claim 1 wherein the n AO repeating units in RP4 comprise 70 to 100 mol % ethylene oxide repeating units, calculated on the number of AO repeating units in RP4.

5. The composition according to claim 1 wherein RP51 represents a hydrocarbyl group having 1 to 8 carbon atoms.

6. The composition according to claim 1 wherein the p AO repeating units in RP5 comprise 95 to 100 mol % of ethylene oxide repeating units, calculated on the number of AO repeating units in RP5.

7. The composition according to claim 1 wherein the mixture of compounds of formula (I) further comprises compounds wherein (D) RP1 is RP3 and RP2 is RP3

(E) RP1 is RP4 and RP2 is RP4

(F) RP1 is RP5 and RP2 is RP5.

8. The composition according to claim 1 comprising at least 12% by weight of compound (A)

at least 9% by weight of compound (B)

at least 10% by weight of compound (C), calculated on the total weight of compounds according to formula (I).

9. The composition according to claim 1 comprising 12 to 33% by weight of compound (A)

9 to 35% by weight of compound (B)

10 to 30% by weight of compound (C), calculated on the total weight of compounds according to formula (I).

10. The composition according to claim 7 comprising at least 4% by weight of compound (D)

at least 6% by weight of compound (E)

at least 4% by weight of compound (F), calculated on the total weight of compounds according to formula (I).

11. The composition according to claim 1 comprising 26 to 55 mol % of RP3

22 to 35 mol % of RP4

22 to 45 mol % of RP5, calculated on the sum of RP3, RP4 and RP5.

12. The composition according to claim 1 wherein the composition comprises one or more salts.

13. The composition according to claim 1 wherein the composition comprises one or more diluents.

14. A liquid composition comprising a diluent and the composition according to claim 1.

15. The liquid composition according to claim 14 comprising a binder.

16. A method of controlling the rheology of a liquid composition, the method comprising:

mixing a liquid composition with a rheology control composition, the rheology control composition comprising a mixture of compounds according to formula (I)

(I)

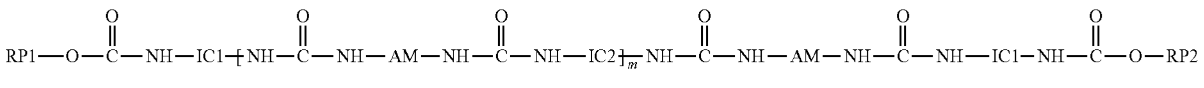

wherein IC1 and IC2 independently of one another and of each occurrence represent a hydrocarbyl group, AM independently of each occurrence represents a hydrocarbyl group, m is the average number of repeating units from 0 to 20, RP1 and RP2 independently of one another and of each occurrence represent an organic group selected from RP3, RP4, RP5, wherein RP3 represents a hydrocarbyl group, RP4 represents an organic group according to formula (II)

$$RP41\text{-}(AO)_n\text{-} \quad (II)$$

wherein RP41 represents a hydrocarbyl group having 1 to 24 carbon atoms,

AO represents an alkylene oxide repeating unit and n is the average number of repeating units from 6 to 30, RP5 represents an organic group according to formula (III)

$$RP51\text{-}(AO)_p\text{-} \quad (III)$$

wherein RP51 represents a hydrocarbyl group having 1 to 24 carbon atoms,

AO represents an alkylene oxide repeating unit and p is the average number of repeating units from 1 to 5, wherein the mixture comprises compounds of formula (I) wherein (A) RP1 is RP3 and RP2 is RP4, (B) RP1 is RP4 and RP2 is RP5, (C) RP1 is RP3 and RP2 is RP5.

17. A coated article, wherein at least a part of the surface of the article is coated with the liquid composition according to claim 14.

* * * * *